United States Patent [19]
Ohshima et al.

[11] 3,951,934
[45] Apr. 20, 1976

[54] POLYMERIZATION OF ACRYLAMIDE IN THE PRESENCE OF WATER-SOLUBLE NITROGEN COMPOUNDS

[75] Inventors: Iwao Ohshima; Seiichi Chiba; Kenzo Ariyama, all of Yokohama; Yasuo Ogawa, Kawasaki; Zengiro Kawamura, Yokohama, all of Japan

[73] Assignee: Nitto Chemical Industry Co., Ltd., Tokyo, Japan

[22] Filed: Sept. 30, 1974

[21] Appl. No.: 510,195

[30] Foreign Application Priority Data
Sept. 29, 1973 Japan............................ 48-109646

[52] U.S. Cl................................. 526/83; 526/217; 526/218; 526/303
[51] Int. Cl.$^2$....................................... C08F 120/56
[58] Field of Search................. 260/89.7 R, 85.5 N, 260/80.3 N

[56] References Cited
UNITED STATES PATENTS

| | | | |
|---|---|---|---|
| 2,380,591 | 7/1945 | Fryling........................... | 260/85.5 N |
| 2,485,270 | 10/1949 | Folt................................. | 260/85.5 N |
| 2,831,841 | 4/1958 | Jones............................ | 260/80.3 N |
| 3,509,113 | 4/1970 | Monagle et al................ | 260/80.3 N |

*Primary Examiner*—Harry Wong
*Attorney, Agent, or Firm*—Sughrue, Rothwell, Mion, Zinn & Macpeak

[57] ABSTRACT

A process for producing a substantially nonionic water-soluble acrylamide polymer produced without the occurence of hydrolysis of the acrylamide polymer by heating when the reaction system undergoes an unavoidable heat aging such as due to heat of polymerization comprising polymerizing a comparatively high concentration aqueous solution of acrylamide in the presence of a specific water-soluble nitrogen compound.

7 Claims, 2 Drawing Figures

POLYMERIZATION OF ACRYLAMIDE IN THE PRESENCE OF WATER-SOLUBLE NITROGEN COMPOUNDS

BACKGROUND OF THE INVENTION

1. Field of the Invention

The present invention relates to a polymerization process of acrylamide and, more particularly, it relates to an improved polymerization process of acrylamide wherein an aqueous solution of an acrylamide monomer in a comparatively high concentration can be easily polymerized by substantially stopping or inhibiting the occurence of hydrolysis of the acrylamide polymer caused by the temperature increase of the reaction system by heat of the polymerization and the unavoidable heat aging in the course from the end of the polymerization to the completion of the cooling operation in an industrial production.

2. Description of the Prior Art

Acrylamide polymers have been widely utilized as soil stabilizers, flocculants for water treatment, mucilage-like materials for paper manufacturing, and other water-soluble polymers. In particular, various utilizations of water-soluble acrylamide polymers have recently been studied, for example, as flocculants, etc., and in using as the flocculant for waste water from paper manufacturing, polyacrylamide which has a high molecular weight and has not been hydrolyzed is frequently required.

The polymerization of acrylamide can be conducted as an aqueous solution polymerization, a suspension polymerization, a solution polymerization, or a block polymerization by a radical initiator, the action of light, ultrasonic waves, high energy radiation, heat, etc., but aqueous solution polymerization has been most widely employed since a polymer having a high molecular weight can be easily obtained, since the monomer used and the polymer produced are soluble in water, and also since the product can be obtained in low cost.

On the other hand, on considering that the use of acrylamide polymers in the form of a powder has recently increased in the fields of flocculants and others, the polymerization of acrylamide in a low concentration which has hitherto been employed frequently is undesirable where the product is to be powdered by drying and a polymerization of acrylamide in a concentration as high as possible has been desired.

However, the viscosity of an aqueous solution of polyacrylamide increases as the molecular weight of the polyacrylamide increases. The concentration of the aqueous solution of polyacrylamide which can be handled as a liquid, that is, a solution which can be transported by pumping and which can be stirred, is up to about 10% by weight of a high molecular weight polyacrylamide which can be used satisfactorily as a flocculant. Thus, it is industrially quite difficult to handle an aqueous solution of polyacrylamide having a concentration higher than about 10% by weight as a liquid.

In order to overcome these difficulties, an aqueous solution of acrylamide at a high concentration is polymerized to provide a massive (gelatinous) product rather than a polymer solution, whereby the product can be handled as a solid, i.e., in transportation, etc., thereof and further the energy required to dry the product can be reduced.

However, on the other hand, on considering the polymerization reaction of acrylamide, the polymerization of an aqueous solution of an acrylamide monomer at a concentration of higher than about 10% by weight, for example, of about 20% by weight is accompanied by the formation of a massive or gelatinous product. The gelatinous character of the product makes it difficult to stir the polymerization system and thus to remove the heat of polymerization. In other words, the same result as in an adiabatic polymerization are obtained in the above described polymerization reaction. Thus, the heat of polymerization of acrylamide, 19.8 ±0.7 Kcal/mol becomes a heat source increasing the temperature of the polymerization system and the heat generated due to the exothermic reaction, as a matter of course, increases as the concentration of the acrylamide monomer in the polymerization increases. The practical temperature increase in the polymerization system is as follows. That is, if the polymerization of acrylamide is carried out at a starting temperature of 25°C in an apparatus which is so constructed that heat does not escape therefrom, the maximum temperature of the polymerization system increases to about 40°C, about 55°C, about 70°C, about 85°C and about 100°C as the concentration of the acrylamide monomer increases to 5%, 10%, 15%, 20%, and 25% by weight, respectively.

In polymerizing an aqueous solution of acrylamide at a comparatively high concentration, the polymerization system becomes a near solid state and thus the removal of the heat of polymerization by stirring becomes difficult. This results in increasing the temperature of the polymerization system and causing a hydrolysis of the polymer produced.

SUMMARY OF THE INVENTION

An object of this invention is to provide a process for producing polyacrylamide having a desired degree of polymerization and quite a low degree of hydrolysis.

Another object of this invention is to provide a process for producing polyacrylamide which can be carried out on an aqueous solution of acrylamide monomer at a comparatively high concentration.

Various experiments and investigations on polymerization processes of acrylamide have been made and as a result thereof it has now been discovered that nitrotrispropionic acid amide, the presence of which in the polymerization system has hitherto been considered to be undesirable since in such case the degree of polymerization of the acrylamide polymer decreases, has an effect of substantially stopping or retarding the hydrolysis of the polymer which occurs due to the increase in the temperature of heat of polymerization and the unavoidable heat aging after polymerization. The present invention is accomplished based on the above finding.

That is, the present invention provides a process for polymerizing acrylamide which comprises polymerizing an aqueous solution of acrylamide in the presence of at least one water-soluble nitrogen compound represented by general formula (I),

represented by the general formula (II),

or represented by the general formula (III),

wherein $R_1$ and $R_2$ each represents —H, —$CH_3$ or —$C_2H_5$; X represents —CN, —COOH, —OH or —$CONH_2$; and $n$ represents an integer of 1 to 4, with the proviso that X in the general formula (III) is not —COOH when $n$ is 1 or 2.

DETAILED DESCRIPTION OF THE INVENTION

Figure 1:
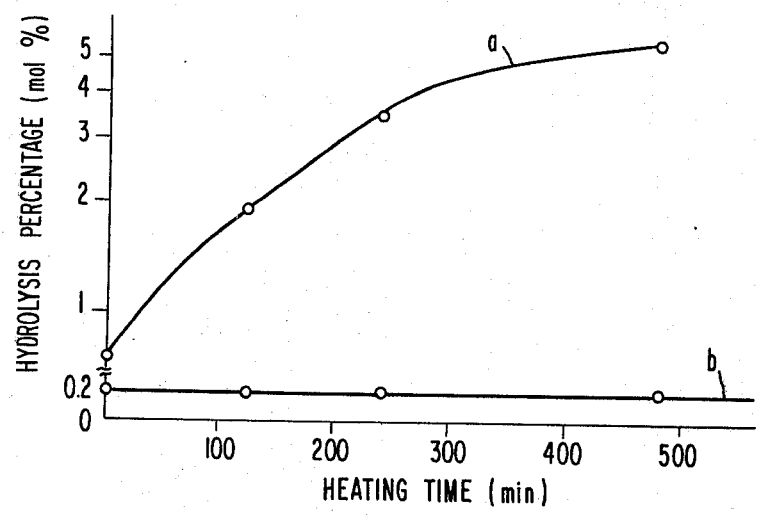
FIGS. 1 and 2 are graphical presentations of the relationship between period of time and hydrolysis progress and the relationship between hydrolysis percentage and viscosity, respectively, of acrylamide polymers.

Examples of particularly useful compounds of the above-described water-soluble nitrogen compounds of the general formulae (I), (II) and (III) are monoethanolamine ($H_2NCH_2CH_2OH$), diethanolamine [$NH(CH_2CH_2OH)_2$], triethanolamine [$N(CH_2CH_2OH)_3$], nitrotrispropionic acid [$N(CH_2CH_2COOH)_3$], nitrilotrispropionic acid amide [$N(CH_2CH_2CONH_2)_3$], dimethylaminomethanol

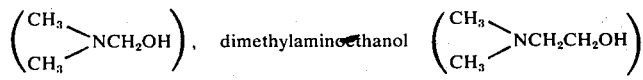

and dimethylaminopropionitrile [$(CH_3)_2NCH_2CH_2CN$]. Urea ($H_2NCONH_2$), glycine ($NH_2CH_2COOH$) and β-alanine ($NH_2CH_2CH_2COOH$), which might be considered similar can not be used since it has been confirmed experimentally that they are inferior to the aforesaid group of the nitrogen compound in inhibiting hydrolysis.

It is not yet completely clear why the above described water soluble nitrogen compounds of the general formulae (I), (II) and (III) stop or inhibit the hydrolysis of the polymer at the heat aging of the product. However, since the hydrolysis of the product polymer is inhibited by the presence of the above described nitrogen compound of the general formulae (I), (II) and (III) in the practical polymerization of acrylamide, the aqueous solution polymerization of acrylamide can be conducted at a high monomer concentration, e.g., at a concentration of about 10 to 30% by weight, preferably about 18 to 25% by weight, without being accompanied by the above described difficulties.

The amount of the nitrogen compound of the general formulae (I), (II) and (III) depends somewhat upon the kind of the nitrogen compound and the concentration of the monomer but is usually from about 0.1% by weight to about 3% by weight, preferably from about 0.3% by weight to about 2% by weight, based on the amount of the monomer. In the polymerization of acrylamide to which the above described nitrogen compound has previously been added, pH control in the reaction system plays an extremely important roll. Hitherto, it has been believed that the presence of the nitrogen compound in the polymerization system decreases the molecular weight of the resulting polymer due to a chain transfer effect. However, in the present invention, an acrylamide polymer can be obtained without causing a decrease in the molecular weight by controlling the pH value of the polymerization system.

The pH of the polymerization system can be determined depending upon the type of the water-soluble nitrogen compound of the general formula (I), (II) or (III) used. When nitrilotrispropionic acid amide is used, the optimum pH of the polymerization system ranges from about 3.5 to about 5.5, and preferably is about 4.5. If the pH of the polymerization system is outside the above described range, for example, higher than 5.5, a chain transfer effect of nitrilotrispropionic acid amide occurs to obstruct the increase of the molecular weight of the polyacrylamide produced to a sufficient degree and if the pH increases further to a too high value, the polyacrylamide formed begins to be hydrolyzed. On the other hand, if the pH is lower than the above described range, the imination reaction which is essentially accompanied with acrylamide takes place in parallel with the polymerization reaction of acrylamide and the formation of the intermolecular bond of the acrylamides results in the formation of undesirable insoluble polymers.

The acrylamide which is used as a starting material in this invention can be an acrylamide monomer obtained in an conventional production process or can be a recrystallized acrylamide monomer.

When an acrylamide monomer is polymerized in a conventional process and the acrylamide polymer formed by the polymerization is subjected to heat aging, hydrolysis of the polymer proceeds gradually and the viscosity of the aqueous solution of the polymer also increases as the hydrolysis reaction progresses. However, by the process of this invention the occurrence of such a hydrolysis is stopped or inhibited and thus substantially no increase in the viscosity of the aqueous solution of the polymer is observed.

The polymerization itself of an acrylamide monomer in an aqueous medium, that is, the aqueous solution polymerization of an acrylamide monomer is known. Therefore, conventional knowledge relative to known polymerizations can be utilized in this invention if the utilization is not contrary to the teachings and spirit of this invention. Examples of the especially preferred polymerization initiators which can be used in the process of this invention are water-soluble azo compounds such as 2-cyano-2-propylazoformamide, 2,2'-azobis(2-amidinopropane) hydrochloride, 4,4'-azobis(4-cyanovaleric acid), and the like. The use of the aforesaid polymerization initiator provides advantages in that the reproducibility of the polymerization is quite superior and further the formation of insoluble matter is not observed in the heat-drying of the polymer formed. However, in the process of this invnetion, other polymerization initiators such as, for example, a water-soluble peroxide/water-soluble tertiary amine oxidation-reduction type polymerization initiator, a water-soluble peroxide/water-soluble sulfite and water-soluble bromate/water-soluble sulfite oxidation-reduction type polymerization initiator can, of course, be used. These polymerization initiators are inferior to the above described water-soluble azo compounds from the standpoint of reproducibility of polymerization and the inhibition of the formation of insoluble matter on drying, and thus are not preferred.

The polymerization temperature can be appropriately selected but in using a water-soluble azo compound as the polymerization initiator for obtaining an acrylamide polymer as a flocculant, it is especially preferred to polymerize the monomer at a temperature of about 20° to 40°C.

The molecular weight of the acrylamide polymer thus obtained is higher than about 5,000,000.

In the polymerization, known polymerization techniques can be applied. However, in an aqueous polymerization of an acrylamide monomer at a comparatively high concentration, the polymerization system can be stirred in a conventional manner before the polymerization or in the first state of the polymerization but as the polymerization progresses, the acrylamide polymer formed becomes a water-containing gelatinous state as described hereinbefore and thus it becomes impossible to continue the stirring of the polymerization system further. Therefore, from this point, in a conventional aqueous solution polymerization process it is believed that the polyacrylamide produced has a nonuniform degree of polymerization distribution due to the nonuniformity of the temperature control. In order to prevent the formation of an acrylamide polymer having an unusual molecular weight, the polymerization is practiced positively in an adiabatic state, whereby a polymer having a uniform degree of polymerization can be obtained. However, the use of only a polymerization vessel having a heat insulating means as the adiabatic means for the polymerization system is not sufficient. This is because a polymerization vessel of a practical scale has some heat capacity and thus the temperature of the portion of the polymerization system which is in contact with the inside wall of the polymerization vessel or near the wall of the polymerization vessel is, as a matter of course, lower than the temperature of the center of the reaction system even if the temperature of the polymerization system increases due to the heat of polymerization in the system. Therefore, in order to maintain the polymerization system at complete adiabatic conditions by controlling the polymerization system so that the temperature of the polymerization vessel is the same as the temperature of the center of the polymerization system, external heating is required. In addition, according to conventional knowledge of polymerization reactions, a polymer having a lower molecular weight ought to be formed with higher polymerization temperatures but, in the process of this invention, the reduction in molecular weight of the polymer produced is not observed even if the temperature of the polymerization system is allowed to increase (for example, when the polymerization is carried out in an adiabatic state where the starting concentration of the monomer is 20% by weight, the temperature of the polymerization system increases by about 60°C or, in other words, the temperature of the polymerization system reaches about 80°C even if the temperature of the polymerization system is 20°C at the start of the polymerization) and further if the polymerization vessel is heated. The reason therefor has not yet been confirmed, but it is believed that the viscosity of the polymerization system is extremely increased, and due to the gel-effect caused by the increased viscosity, the polymerization reaction is considered to proceed predominantly over the stopping reaction.

That is, by practicing the process of this invention having the above described features, polyacrylamide having substantially no partially hydrolyzed portion can be easily produced and the requirement of nonionic polyacrylamide can be sufficiently fulfilled.

The following examples are given to illustrate the invention in greater detail. Unless otherwise indicated, all parts, percents, ratios and the like are by weight.

REFERENCE EXAMPLE 1

The relationship between the heating period of time and the progress of hydrolysis when polyacrylamide is placed in an atmosphere of 95°C is illustrated in FIG. 1 of the accompanying drawings. In the figure, Curve $a$ shows the state of the hydrolysis of the polyacrylamide prepared by a conventional polymerization process by heat aging and Curve $b$ shows the state of hydrolysis of the polyacrylamide prepared by adding 1% by weight of triethanolamine based on the amount of acrylamide according to this invention when the polymer is subjected to the same heat aging. As is clear from the results, the presence of triethanolamine is effective to stop the hydrolysis even if the polymerization system is heated. Such a tendency was also observed in using other nitrogen compounds as described before as the specific nitrogen compounds. In addition, the measurement of the hydrolysis will be explained in Reference Example 2.

REFERENCE EXAMPLE 2

Figure 2:
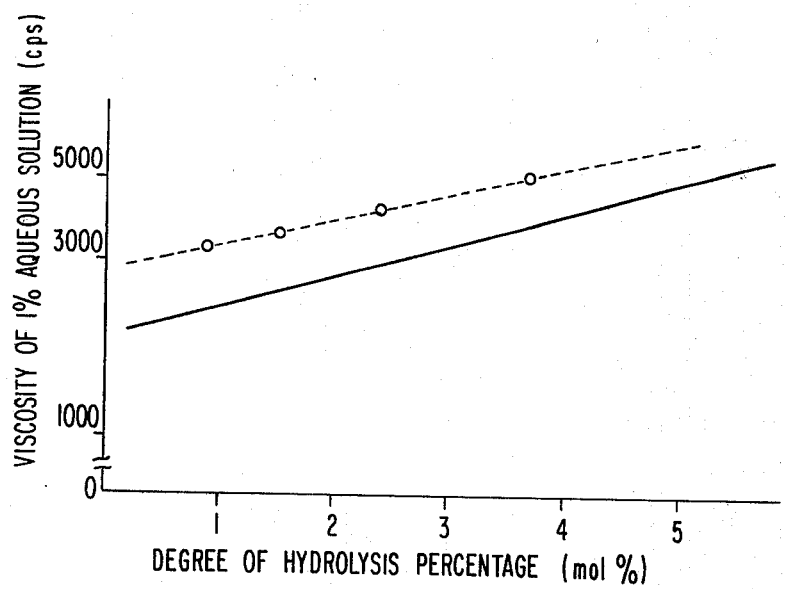

The relationship between the hydrolysis percentage and the viscosity of the aqueous solution of a polyacrylamide having a concentration of 1% by weight is illustrated in FIG. 2. Five kinds of partially hydrolyzed polyacrylamides having different hydrolysis percentages were prepared by hydrolyzing polyacrylamide having a molecular weight of about 8,000,000 with an alkali and the viscosity of a 1% aqueous solution of each polyacrylamide was measured in centipoise, the results being shown by the solid line in FIG. 2.

On the other hand, the state of the polyacrylamide prepared in the following Examples without adding the water-soluble nitrogen compound is shown by the dotted line in FIG. 2. From the tendency of the dotted line, it can be understood that the state shown by the dotted line becomes almost the same as the state of the solid line as the hydrolysis percentage increases and also since the dotted line is disposed above the solid line (or on the high viscosity side), it can be understood that the molecular weight of the polyacrylamides prepared in the Examples are higher than 8,000,000.

The measurement of the hydrolysis percentage practiced in the above Reference Examples and the following Examples was conducted by a potentiometric titration. Also, the measurement of the viscosity of the solution was conducted using a Brookfield Viscometer with No. 2 rotor at 6 rpm and 25°C.

EXAMPLE 1

A mixture of 100 parts by weight of acrylamide and 1.0 part of the nitrogen compound as listed in the table shown below was subjected to an aqueous solution polymerization and the state of the hydrolysis progression was measured. That is, the polymerization was conducted as follows. In 770 g of water purified with an ion-exchange resin was dissolved 220 g of acrylamide, the solution was poured in a 2 liter Dewar vessel, and then the temperature of the solution was adjusted to 30°C. After the pH of the solution was adjusted to 4.5, the air in the reaction system was displaced with nitrogen gas and then 10 ml of an aqueous solution of 1% by weight 2,2′-azobis(2-amidinopropane) hydrochloride was added to the system. After the induction period was over, the polymerization proceeded rapidly and the temperature of the polymerization system reached the maximum temperature, about 95°C. At this point, the gelatinous polymer produced was withdrawn and immediately divided into four portions, one portion of which was cooled and three portions of which were heated in an air bath at 95°C for 2 hours, 4 hours and 8 hours, respectively (heat aging). The hydrolysis percentage of each portion of the polymer and the viscosity increase of a 1% aqueous solution of each portion of the polymer are shown in the following table.

| Water-Soluble Nitrogen Compound | Heating Time (hour) | Hydrolysis Percentage (mol %) | Viscosity Increase (%) |
|---|---|---|---|
| Monomethanolamine | 0 | 0.3 | 0 |
|  | 2 | 0.3 | 0 |
|  | 4 | 0.3 | 4 |
|  | 8 | 0.3 | 4 |
| Diethanolamine | 0 | 0.4 | 0 |
|  | 2 | 0.4 | 4 |
|  | 4 | 0.5 | 0 |
|  | 8 | 0.5 | 0 |
| Triethanolamine | 0 | 0.2 | 0 |
|  | 2 | 0.1 | 11 |
|  | 4 | 0.1 | 7 |
|  | 8 | 0.2 | 11 |
| Dimethylaminopropionitrile | 0 | 0.3 | 0 |
|  | 2 | 0.6 | 7 |
|  | 4 | 0.7 | 4 |
|  | 8 | 0.8 | 4 |
| Nitrilotrispropionic acid | 0 | 0.2 | 0 |
|  | 2 | 0.1 | 0 |
|  | 4 | 0.2 | 4 |
|  | 8 | 0.5 | 7 |
| Nitrilotrispropionic Acid Amide | 0 | 0.1 | 0 |
|  | 2 | 0.1 | 3 |
|  | 4 | 0.1 | 3 |
|  | 8 | 0.2 | 7 |
| Dimethylaminomethanol | 0 | 0.3 | 0 |
|  | 2 | 0.5 | 5 |
|  | 2 | 0.7 | 6 |
|  | 5 | 0.6 | 6 |
| Dimethylaminoethanol | 0 | 0.3 | 0 |
|  | 2 | 0.6 | 3 |
|  | 4 | 0.7 | 5 |
|  | 8 | 0.7 | 5 |
| None | 0 | 0.9 | 0 |
|  | 2 | 1.5 | 9 |
|  | 4 | 2.4 | 28 |
|  | 8 | 3.7 | 72 |
| Glycine | 0 | 0.2 | 0 |
|  | 2 | 0.4 | 20 |
|  | 4 | 1.3 | 28 |
|  | 8 | 3.2 | 84 |
| 5,5′-Dimethylhydantoin | 0 | 0.1 | 0 |
|  | 2 | 0.7 | 4 |
|  | 4 | 1.2 | 54 |
|  | 8 | 3.5 | 123 |
| Urea | 0 | 0.6 | 0 |
|  | 2 | 1.3 | 28 |
|  | 4 | 1.4 | 44 |
|  | 8 | 3.7 | 72 |

EXAMPLE 2

A mixture of 100 parts by weight acrylamide and 2.5 parts of the nitrilotrispropionic acid amide was subjected to an aqueous solution polymerization as follows. 180 g of acrylamide was dissolved in 810 g of water purified with an ion-exchange resin, and the resulting solution was poured into the same four vessels as those used in Example 1. The temperature of the solution was adjusted to 40°C. After the pH of the solution was adjusted to 4.5, 5.0, 5.5, and 6.0, respectively, the air in the vessel was displaced with nitrogen gas. 10 ml of an aqueous solution of 0.5% by weight azobis(amidinopropane) hydrochloride was then added to each of the four systems. After the induction period was over, the polymerization proceeded and the temperature of the polymerization system reached the maximum temperature. At this point, the gelatinous polymer produced was withdrawn to determine the hydrolysis percentage, and the viscosity increase of 1% aqueous solution. The results obtained are shown in the table below.

| pH | Hydrolysis Percentage (mol%) | Viscosity (cps) | Water-Insoluble Matter in Polymer* |
|---|---|---|---|
| 4.0 | 0.3 | 3,300 | X |
| 4.5 | 0.2 | 2,900 | 0 |
| 5.0 | 0.5 | 3,100 | 0 |
| 5.5 | 0.5 | 2,900 | 0 |
| 6.0 | 0.2 | 1,800 | 0 |

Note
*1 g of the dry powdered polymer was dissolved in 1 liter of water and the solution was filtered with a 80 mesh metal net. "X" means that a substantial amount of a water-insoluble matter swollen with water remained on the metal net and "0" means that substantially no water-insoluble matter was observed on the metal net.

While the present invention has been described in detail and with reference to the specific embodiments thereof, it will be apparent to one skilled in the art that many changes and modifications can be made therein without departing from the spirit and scope thereof.

What is claimed is:

1. A process for producing a high-molecular weight water-soluble acrylamide homopolymer by polymerizing acrylamide in a aqueous medium at a high concentration, which comprises polymerizing said acrylamide at a concentration of from about 10 to 30% by weight in the presence of at least one of the water-soluble nitrogen compounds represented by the general formulae $$N(C_nH_{2n}X)_3 \quad \text{(I)}$$
$$R_1N(C_nH_{2n}X)_2, \quad \text{(II)}$$

or

 (III)

wherein $R_1$ and $R_2$ each represents —H, —CH$_3$ or —C$_2$H$_5$; X represents —CN, —COOH, —OH or —CONH$_2$; and $n$ is an integer of from 1 to 4, with the proviso that X in the general formula (III) is not —COOH when $n$ is 1 or 2, said water soluble nitrogen containing compounds being present in an amount of from about 0.1 to about 3% by weight based on the amount of said acrylamide, and the pH of said polymerization system being maintained at about 3.5 to about 5.5.

2. The process as claimed in claim 1, wherein said polymerization is conducted at a neutral state or an acid state.

3. The process as claimed in claim 1, wherein said water-soluble nitrogen compound is ethanolamine, diethanolamine, triethanolamine nitrilotrispropionic acid, nitrilotrispropionic acid amide, dimethylaminomethanol, dimethylaminoethanol, or dimethylaminopropionitrile.

4. The process as claimed in claim 1, wherein said water-soluble nitrogen compound is nitrilotrispropionic acid amide.

5. The process as claimed in claim 1, wherein said polymerization is conducted in the presence of a polymerization initiator.

6. The process as claimed in claim 5, wherein said polymerization initiator is 2-cyano-2-propylazoformamide, 2,2'-azobis(2amidinopropane)hydrochloride, or 4,4'-azobis-(4-cyanovaleric acid).

7. The process as claimed in claim 6, wherein the polymerization is conducted at a temperature of from 20° to 40°C.

* * * * *